Sept. 14, 1937.  E. E. EDWARDS ET AL  2,092,912
DELIVERY SERVICE APPLIANCE
Filed May 19, 1934

INVENTORS
Evan E. Edwards,
John C. Edwards, and
Robert J. Barron,
by their atty's
Byrnes Stebbins & Blenko Patented Sept. 14, 1937

2,092,912

UNITED STATES PATENT OFFICE 2,092,912

DELIVERY SERVICE APPLIANCE

Evan E. Edwards, John C. Edwards, and Robert J. Barron, New Kensington, Pa.

Application May 19, 1934, Serial No. 726,530

5 Claims. (Cl. 248—312)

This invention relates to delivery service appliances and is herein particularly described as employed in an appliance in which a milk bottle or like article and a newspaper or like article may be placed and detachably retained at a desired location on the side of a building above the floor or ground level.

It is quite undesirable to place a milk bottle on the floor or ground outside a dwelling or building as it is thereby exposed to the unwelcome attentions of stray animals and small children and is exposed to petty thieves, breakage, and other misfortunes. Our invention provides a device in which a milk bottle may be readily placed and securely held in a desired location above the floor or ground level and in such manner that the bottle may be readily detached from the holder.

Our milk holder may be readily combined with a clip for holding a newspaper or like article, with which clip the holder will cooperate. The milk bottle holder when not in use will lie close to the paper clip so that it will not unduly project out from a side of the building against which the appliance is secured. The clip provides a convenient and safe place in which a newspaper or like article may be securely held in any desired location so that the newspaper will not be mutilated, soiled, or blown away by the action of the elements as frequently occurs and from which holder or clip the newspaper may be readily removed. Our invention is preferably so designed that the paper clip may be widely distended without harming the clip, as the terminal portions of the clip are shaped to form coiled springs which allow a very considerable latitude of movement. The combination of milk holder and newspaper clip will present a neat and pleasing appearance and will together comprise a unitary article which can be conveniently manufactured.

In the accompanying drawing, illustrating our invention,

Figure 1:
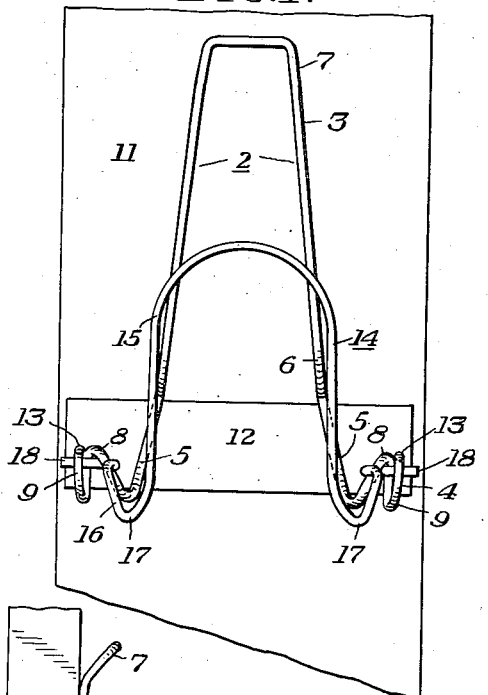
Figure 1 is a front elevation showing the paper clip and the bottle holder in its inoperative or collapsed position.
Figure 2:
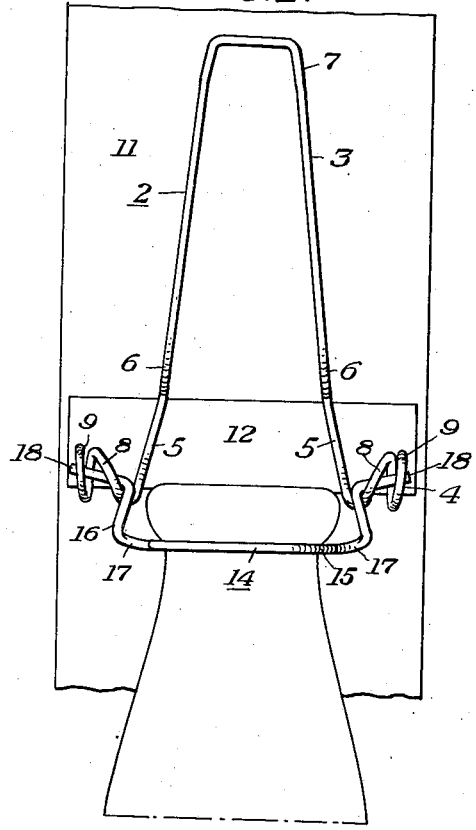
Figure 2 is a view similar to Figure 1 but showing the bottle holder in its operative position with a milk bottle therein.
Figure 3:
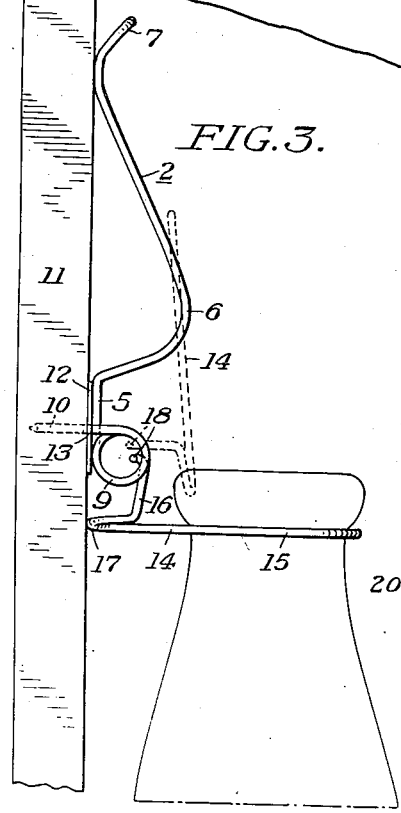
Figure 3 is a side elevation showing the paper clip and the bottle holder, the latter being in use to sustain a milk bottle.

The appliance shown in Figures 1, 2, and 3 comprises a curved supporting member or article holding clip 2, preferably made of stiff resilient wire shaped as shown in the drawing and having a clip portion 3 and terminal portions 4. The clip portion has a straight portion 5 and an outwardly curved portion 6, the upper U-shaped portion 7 of the clip being flared outwardly and upwardly at a convenient angle, as shown in Figure 3. The terminal portions 4 of the clip are coiled or looped, two convolutions 8 and 9 being shown, and the extreme ends 10 of the wire are pointed so that they may be driven into the side of the supporting structure 11. The clip is thus fastened in the desired position. The inner loop or convolution 8 is shaped so as to form the cam as shown in Figures 1 and 2. These cams cooperate with the bottle holder as will be later described.

A plate 12 of sheet material is provided which lies flat on the surface to which the appliance is to be attached and has therein two holes 13 at opposite ends thereof through which the pointed ends 10 of the paper clip 2 pass. The holes are spaced apart a predetermined distance. The plates, therefore, serve as spacing members for determining where the pointed ends 10 of the clip shall be driven into the support and when in position serve to protect the surface of the supporting structure.

The bottle clip or holder 14 is formed from a length of stiff resilient wire and has a substantially U-shaped yoke portion 15 curved to embrace the constricted portion of the milk bottle just below its top. The terminal portions 16 are curved as shown in the drawing and have a curved projection 17 which rests against the support when the holder is in its operative position (see Fig. 3). The extreme ends are formed into prongs 18, which are passed through the loops 8 and 9 of the paper clip so as to be loosely hinged therein. The loop 15 of the bottle holder is made somewhat wider than the distance between the terminal portions 8—8 of the paper clip so that when the end prongs 18 of the bottle holder are placed inside the coiled ends 8—8 of the paper clip the loop portion 15 of the holder is compressed. As the inner convolutions 8 of the paper clip are shaped so as to form cams, the spring-like action of the bottle holder, due to its compression in cooperation with the cammed convolutions 8, causes the holder to be spring upwardly into a substantially vertical plane overlying the paper or article holding clip and remain in this plane when the holder is empty. This is due to the fact that the tendency of the arms of the loop to spring apart by reason of the resilience of the metal exerts a pressure against the spiraled cam surfaces of the convolutions 8, and the resulting component of forces is such as to cause the holder to spring upwardly. When the holder is swung downwardly from this position, the cam surfaces 8 force the arms of the yoke together against the inherent resilience or spring of the metal.

A bottle is placed in position in the holder by inserting in the loop portion of the holder the reduced portion of the bottle immediately below the top and pushing it upward until the top is inside the loop and then allowing the bottle to assume the vertical position as shown in Figure 3, the holder at this time being horizontal with the portion 17 preventing the holder from dropping below the horizontal position. As the holder assumes the horizontal positions shown in Figures 2 and 3, the cammed loops 8 of the paper clip force the bottle holder loop 15 inwardly and the bottle is thus held securely. To remove the bottle, the lower end of the bottle is lifted in a radial direction away from the support, and, when it assumes an almost horizontal position, the loop expands and the bottle can be readily slipped out of the holder.

Figure 4:
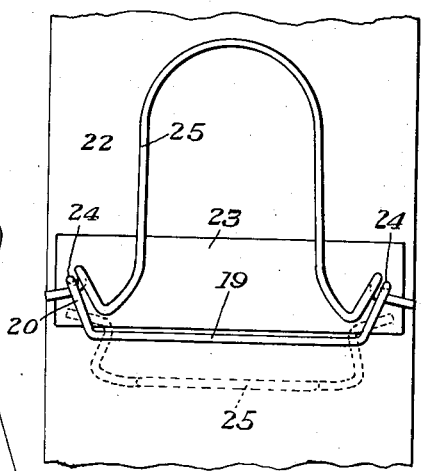
Figure 4 is a front elevation of another form of our invention showing the bottle holder apart from the clip.
Figure 5:
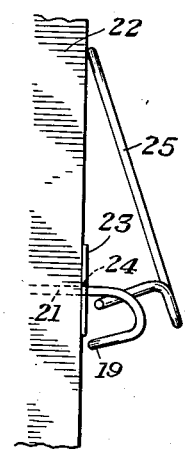
Figure 5 is a side elevation of the bottle holder as shown in Figure 4 in its inoperative or collapsed position.

In Figures 4 and 5, we have shown a bottle holder without the paper or article holding clip. In this embodiment of the invention, a wire member 19 has a portion 20 adjacent to its terminal shaped so as to form a cam and the prongs or ends 21 of the member are adapted to be driven into the support 22 (see Figure 5). A plate 23 having holes 24 therein spaced a predetermined distance apart serves as a guide for spacing the ends 21 of the hinge bar 19 while the bar is being fastened to the support. The bottle holder 25 is precisely the same as hitherto described above in connection with Figures 1, 2, and 3, and the operation thereof is the same as the operation of the holder 15 already described.

If preferred, either appliance can be secured to a separate backing member, which, in turn, may be secured to the upright support or the appliance can be attached directly to the support.

It is apparent that our invention provides a most convenient, strong, and simple appliance which can be used for holding newspapers and small parcels with a range of operation greater than any clip that we have hitherto known. The appliance also serves to hold a milk bottle in a safe, convenient, and accessible position where it is retained until it is released by a definite action of the householder.

We have illustrated and described by way of example only two types of our preferred appliance, but it will be understood that the invention is not limited thereto but may be otherwise embodied within the scope of the following claims.

We claim:

1. A delivery service appliance comprising a holder adapted to receive and hold a milk bottle or the like, said holder being substantially U-shaped, and means providing a pivotal support for the ends of said holder, said means also being provided with cam surfaces for forcing the ends of the U-shaped member together when it is rotated in one direction with respect to the said means.

2. A delivery service appliance comprising a clip member adapted to be secured to a support and to receive and hold a milk bottle or the like, said clip member being substantially U-shaped, and means providing a pivotal support for the ends of said clip member, said means also being provided with cam surfaces for forcing the ends of the U-shaped member together when it is rotated in one direction with respect to the said means, said clip being resilient whereby it expands when rotated in the opposite direction.

3. A delivery service appliance comprising a support, a bottle clip carried on the support and supported for movement therein from a vertical position to a horizontal position, means on the clip for arresting the downward movement of the clip, and means for forcing the sides of the clip closer together about a bottle neck when the clip is moved down.

4. A delivery service appliance comprising a holder adapted to receive and hold a milk bottle or the like, said holder being substantially U-shaped, means providing a pivotal support for the open ends of said holder, said means also being provided with cam surfaces for forcing the ends of the U-shaped member together when it is rotated in one direction with respect to the said means, and means on the holder for supporting the holder when in a substantially horizontal position.

5. A delivery service appliance comprising a holder having a U-shaped yoke portion curved to embrace the constricted portion of a milk bottle just below the top thereof and end portions formed into prongs projecting approximately at right angles to the axis of the yoke portions, a projection on said holder adjacent the ends for supporting the holder when in a horizontal position, means providing a pivotal support for the ends of said holder, and means for forcing the sides of the yoke portion closer together about a bottle neck when the holder is moved from a vertical position to a horizontal position.

EVAN E. EDWARDS.
JOHN C. EDWARDS.
ROBERT J. BARRON.